(12) United States Patent
Jain

(10) Patent No.: US 7,185,103 B1
(45) Date of Patent: Feb. 27, 2007

(54) RATE-CONTROLLED TRANSMISSION OF TRAFFIC FLOW INFORMATION

(75) Inventor: Sandeep Jain, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 567 days.

(21) Appl. No.: 10/241,785

(22) Filed: Sep. 10, 2002

(51) Int. Cl.
*G06F 15/16* (2006.01)

(52) U.S. Cl. .................................... 709/234

(58) Field of Classification Search ................ 709/223, 709/234, 238, 233; 710/29, 33, 52
See application file for complete search history.

(56) References Cited

U.S. PATENT DOCUMENTS

| | | | | |
|---|---|---|---|---|
| 3,962,681 A | * | 6/1976 | Requa et al. ................ | 382/318 |
| 4,032,899 A | * | 6/1977 | Jenny et al. ................ | 710/316 |
| 4,600,319 A | * | 7/1986 | Everett, Jr. .................. | 400/54 |
| 5,408,539 A | * | 4/1995 | Finlay et al. ................ | 382/298 |
| 6,011,795 A | | 1/2000 | Varghese et al. | |
| 6,018,765 A | * | 1/2000 | Durana et al. .............. | 709/217 |
| 6,499,088 B1 | * | 12/2002 | Wexler et al. .............. | 711/152 |
| 6,751,663 B1 | | 6/2004 | Farrell et al. | |
| 2002/0141343 A1 | | 10/2002 | Bays | |
| 2003/0120769 A1 | | 6/2003 | McCollom et al. | |
| 2003/0214913 A1 | | 11/2003 | Kan et al. | |

* cited by examiner

*Primary Examiner*—David Y. Eng
(74) *Attorney, Agent, or Firm*—Shumaker & Sieffert, P.A.

(57) ABSTRACT

Network analysis techniques are described for generating and outputting traffic flow packets which include traffic flow information indicative of network traffic flows. More specifically, the traffic flow packets may be generated and output in a rate-controlled fashion, which can avoid data loss of traffic flow information in the traffic flow packets. For example, rate-controlled transmission can be extremely useful in ensuring that transmitted traffic flow packets will be received by a packet flow collector without overloading input buffers of the packet flow collector.

43 Claims, 10 Drawing Sheets

| PACKET FLOW | PACKET COUNT | BYTE COUNT |
|---|---|---|
| 192.168/16 | 540452 | 7321042 |
| 192.168.1/24 | 1086358 | 14563004 |
| 192.168.1/24 | 1056 | 10672 |
| 192.168.1/24 | 2067 | 32046 |
| 192.168.1.254. 10.0.0.1.TCP/72 | 10456 | 156345 |
| 192.168.1.254. 10.0.0.1.TCP. HTTP/88 | 4045 | 63526 |
| 192.168.1.254. 10.0.0.1.TCP. HTTPS/88 | 60524 | 845622 |
| 192.168.1.254. 10.0.0.1.TCP. HTTP. 3072/104 | 7745 | 924450 |

RATE-CONTROLLED TRANSMISSION OF TRAFFIC FLOW INFORMATION

TECHNICAL FIELD

The invention relates to computer networks and, more particularly, to traffic flow analysis within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

The devices communicate the packets according to a communication protocol that defines the format of the packets. A typical packet, for example, includes a header carrying source and destination information, as well as a payload that carries the data being transmitted. The standard for packet-based communication in the Internet, is the Internet Protocol (IP).

In general, a network analyzer is a device used to monitor and record traffic flows in a network. For example, a network analyzer may capture data from the network, and generate traffic flow statistics indicative of the traffic flow in the network. The network analyzer may locally store the traffic flow statistics, but more often, the network analyzer communicates the traffic flow statistics to another network device, referred to as packet flow collector, that can be used by a network administrator to examine traffic flows through the entire network. Specifically, the network analyzer generates traffic flow packets that include the accumulated statistics, i.e., the traffic flow information, for individual packet flows of the monitored network. In many network environments, the traffic flow collector may receive traffic flow information via traffic flow packets sent from various network locations. Consequently, a network administrator can use the packet flow collector to analyze overall network traffic flow.

Conventional network analyzers comprise dedicated computers that extract traffic flow information from packets being sent between routers or other devices in the network. In addition, a network router, switch, hub, or other device, may include traffic analysis functions to generate traffic flow packets based on the traffic flow that occurs through the device. In either case, the network analyzers typically compute traffic flow information, and generate traffic flow packets to communicate the traffic flow information to the packet flow collector. The information generated by network analyzers and contained in the traffic flow packets may be used to improve network planning, traffic engineering, network monitoring, usage-based billing and the like. In addition, the information contained in the traffic flow packets may be used to identify denial of service (DoS) attacks, or other network events related to network security.

Conventional network analyzers monitor the network and compute traffic flow information over a period of time, and then send a large collection of traffic flow packets to the packet flow collector. For example, network analyzers may accumulate flow statistics into a database or other data structure and, upon expiration of a defined period or upon collecting a defined amount of data, transmit all of the flow information in a burst of traffic flow packets. This burst of traffic flow packets may consume significant network bandwidth, and may overload or otherwise burden the packet flow collector. These effects may be more noticeable in network environments having multiple network analyzers.

SUMMARY

In general, the invention is directed to techniques for improving network analysis. In particular, techniques are described for generating and outputting traffic flow packets which include traffic flow information indicative of network traffic flows. More specifically, the traffic flow packets may be output in a rate-controlled fashion, which can avoid data loss of traffic flow information in the traffic flow packets. Rate-controlled output can be extremely useful in ensuring that transmitted traffic flow packets will be received by a packet flow collector without overloading input buffers of the packet flow collector.

In one embodiment, a method includes receiving first packets from a network and generating traffic flow information for the first packets. The method may also include outputting second packets including the traffic flow information in a rate-controlled manner.

In another embodiment, a method comprises receiving first packets from a network, defining a first data structure as an aggregation data structure and a second data structure as an export data structure, and aggregating traffic flow information for a first set of the first packets in the first data structure. The method further includes redefining the first data structure as the export data structure and the second data structure as the aggregation data structure, aggregating traffic flow information for a second set of the first packets in the second data structure, and outputting a first set of second packets, the first set of second packet including the traffic flow information in the first data structure.

In another embodiment, an apparatus includes at least one network interface to receive first packets from a network and a traffic flow module to generate traffic flow information based on the first packets. In addition, the traffic flow module can output second packets including the traffic flow information in a rate-controlled manner. For example, the apparatus may comprise a network router, a gateway, a switch, a hub, a server, a workstation, or the like.

In another embodiment, an apparatus comprises at least one network interface to receive first packets from a network, a first data structure to accumulate traffic flow information corresponding to a first set of the first packets, a second data structure to accumulate traffic flow information corresponding to a second set of the first packets, and a controller to output second packets based on the accumulated traffic flow information in the first and second data structures. The controller can cause output of a first set of second packets corresponding to information in the first data structure during a period of time when traffic flow information is accumulated in the second data structure.

In an added embodiment, the invention may comprise a traffic flow service card capable of removable insertion into a network device. In that case, the traffic flow service card may comprise an interface for insertion within a slot of the network device, and a traffic flow module coupled to the interface to generate traffic flow information based on first packets received by the network device and output second packets including the traffic flow information in a rate-controlled manner.

In other embodiments, the invention may comprise a computer readable medium comprising instructions that upon execution in a network analyzer cause the network analyzer to perform one or more of the techniques described herein. In still other embodiments, the invention may comprise a computer readable medium that stores the data structures described herein.

The described techniques may provide one or more advantages. In particular, the techniques may improve traffic flow analysis by facilitating rate-controlled transmission of traffic flow packets. Importantly, rate-controlled transmission of traffic flow packets can avoid a scenario where a packet flow collector is overloaded with traffic flow packets. Accordingly, the invention can avoid data loss of traffic flow packets, and thereby improve network analysis.

The techniques described herein may be readily integrated within a network router of a packet-based network. The router may, for example, operate as a core router within the Internet to route packets received from high data rate communication links, such as OC-3, OC-12, OC-48, OC-192 and greater communication links. The router may integrate flow analysis functionality to generate flow records for routed packets. In this manner, the router can improve identification of network events, such as Denial of Service (DoS) attacks and other network security violations.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 is an alternative diagram of a data structure in the form of a table.

DETAILED DESCRIPTION

Figure 1:
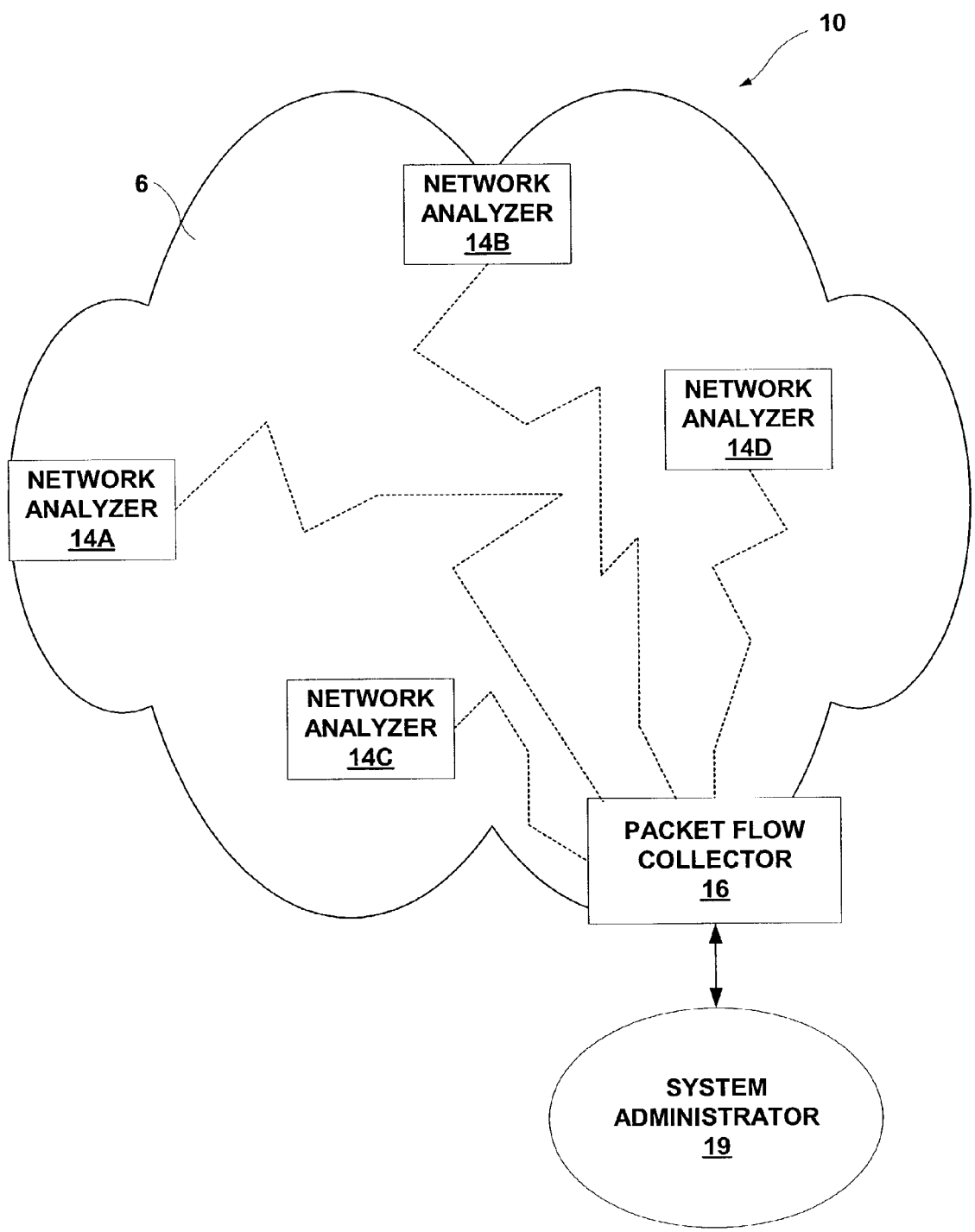
FIG. 1 illustrates an exemplary system in which a set of network analyzers transmit traffic flow packets to a packet flow collector in accordance with the principles of the invention.

FIG. 1 illustrates an exemplary system 10 in which a number of network analyzers 14A–14D, hereafter network analyzers 14, generate traffic flow packets and transmit the traffic flow packets to packet flow collector 16 in accordance with the principles of the invention. Network analyzers 14 may comprise dedicated computers or specialized devices, network routers, or other network devices that can be used for traffic analysis, including but not limited to gateways, switches, hubs, servers, workstations, and the like. Network 6 may be formed by an interconnected group of autonomous systems, each representing an independent administrative domain having a variety of networked resources capable of packet-based communication. Alternatively, network 6 may correspond to a single autonomous system that may or may not be connected to other autonomous systems. In addition, network 6 may comprise a local area network. In any case, network 6 may include servers, workstations, network printers and fax machines, gateways, routers, and the like, coupled to one another via communication links.

The term "packet" is used herein to generally describe a unit of data communicated between network devices in conformance with a packet-based communication protocol. The principles of the invention are readily applicable to systems implementing any of a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any such unit of data, and may be interchanged with the term "cell," or other similar terms used in such protocols to describe a unit of data communicated between resources within the network.

The phrase "traffic flow packet" is used herein to describe a packet having a payload that specifically includes traffic flow information. As one example, traffic flow packets may correspond to "cflowd" packets generated according to a flow analysis tool such as NetFlow™ created by Cisco Systems. The Cooperative Association for Internet Data Analysis (CAIDA) has also developed flow analysis tools for analyzing cflowd packets. As outlined in greater detail below, these or other traffic flow packets that include traffic flow information in the payload can be exported for transmission in a rate-controlled manner consistent with the principles of the invention. Consequently, transmission of traffic flow packets can occur in a way that avoids data loss at packet collector 16, even if a number of network analyzers 14 are simultaneously sending traffic flow packets to the packet collector 16.

Network analyzers 14 may include one or more traffic flow modules (not shown in FIG. 1) that accumulate flow statistics for traffic within network 6. More specifically, network analyzers 14 receive or otherwise capture packets from one or more links within network 6, and compute flow statistics indicative of packet flow over the link. As network analyzers 14 receive packets, the traffic flow modules associate the received packets with respective packet flows, and update the statistics for the packets flows. For example, the traffic flow modules may maintain a packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, or the like, for each packet flow.

The traffic flow modules may provide accounting capabilities for maintaining accurate flow statistics for all of the packets received by network analyzers 14. For example, the traffic flow modules may monitor and generate statistics for high traffic rates, even core traffic rates of the Internet, including but not limited to OC-3, OC-12, OC-48, OC-192 and higher or lower rates. The particular packet flows being monitored may be defined by source and/or destination network addresses. Additionally, other routing information within packets may readily be used to define the packet flows for which flow statistics are maintained, such as MPLS labels, VPN labels, Class of Service (CoS) information, and the like. In this manner, statistics for particularized packet flows can be maintained to a level of granularity desired for effective traffic analysis.

Network analyzers 14 output a stream of traffic flow packets that carry traffic flow information. The traffic flow packets, in particular, may include statistical data for each flow, such as a number of packets, a number of bytes, a time of capturing a first packet for the flow, a time of capturing a most recent packet for the flow, an incoming interface, an outgoing interface, a source/destination network mask, a source/destination Autonomous System (AS) number, or the like. Packet flow collector 16 receives the traffic flow packets sent by network analyzers 14, and updates an accounting system based on the received traffic flow packets.

Packet flow collector 16 receives traffic flow packets from network analyzers 14, and stores the traffic flow information carried by the traffic flow packets within a database or other suitable data structure. In addition, packet flow collector 16 may analyze the received traffic flow packets to identify any suspicious packet flows. For example, packet flow collector 16 may identify packet flows arising from Denial of Service (DOS) attacks and other network security violations. In this manner, analysis of traffic flows through network 6 can improve network reliability and be used to reduce the potential for security breeches or other network events. In addition, packet flow collector 16 may use traffic flow analysis to improve network performance.

A system administrator 19 operating packet flow collector 16 may provide programmable information to network analyzers 14 to specify particular packet flows to be monitored. In this manner, administrator 19 may selectively define the packet flows, and packets within a given flow, that are intercepted for analysis. Alternatively, all packet flows, or a defined subset of packet flows may be defined at each network analyzer 14, without administrative direction from packet flow collector 16. In some cases, traffic flows may be monitored for every packet transmitted through network 6. Alternatively, a subset of the transmitted packets may be monitored by selectively sampling one or more packet flows, or by sampling a given packet flow for only a period of time.

As described herein, network analyzers 14 can be configured to transmit traffic flow packets to packet flow collector 16 in a rate-controlled fashion. In other words, each of network analyzers 14 may convey the information to packet collector 16 via respective traffic flow packets in a rate-controlled manner using multiple packet streams over a period of time. In this manner, network analyzers 14 avoid outputting bursts of packets that may carry all of the information computed by the respective analyzer, but that may overload or burden packet collector 16.

Consequently, the transmission of traffic flow packets from network analyzers 14 to packet flow collector 16 can be made more robust, thereby avoiding data loss. For this reason, rate-controlled transmission can be extremely useful in ensuring that transmitted traffic flow packets will be received by packet flow collector 16 without overloading input buffers or other resources of packet flow collector 16.

Figure 2:
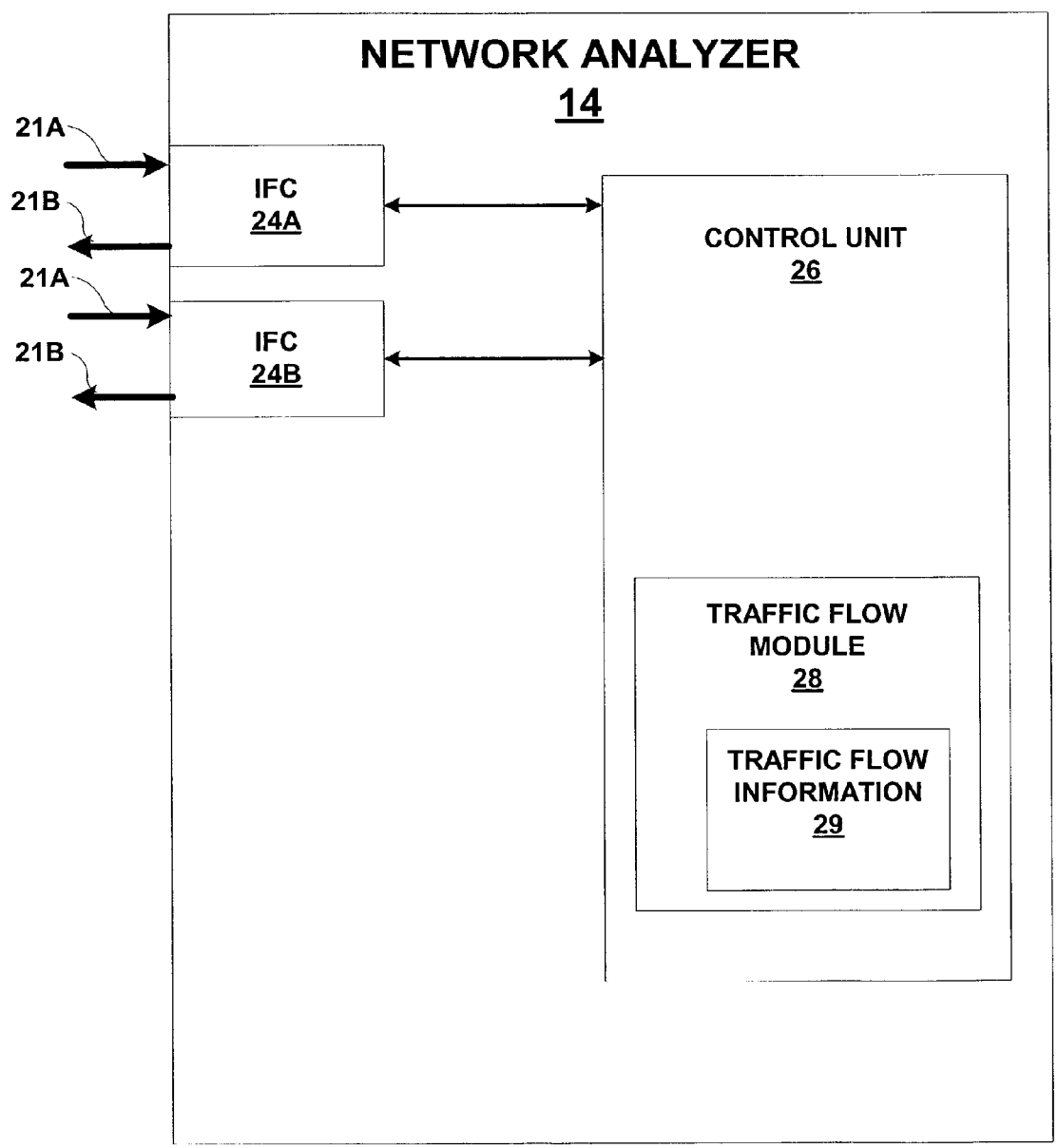
FIG. 2 is a block diagram illustrating an example embodiment of a network analyzer consistent with the principles of the invention.

FIG. 2 is a block diagram illustrating in further detail an example embodiment of network analyzer 14 coupled to communication links 21 of network 6 (FIG. 1). Network analyzer 14 may comprise a fully functional network router that receives packets and forwards the packets to a next hop according to routing tables. Alternatively, network analyzer 14 may comprise another network device, such as a gateway, switch, hub, workstation, or the like. In some cases, network analyzer 14 comprises a computer dedicated solely to traffic analysis. For example, optical splitters (not shown) may be inserted within communication links of network 6 (FIG. 1) to passively duplicate optical data transmitted and received between routers of network 6 for duplicated transmission to a network analyzer 14.

In the embodiment of FIG. 2, network analyzer 14 is configured with interface cards (IFCs) 24, although the invention is not limited in that respect. For example, IFCs 24 may be removably inserted into a chassis that houses control unit 26. The use of IFCs 24 can provide scalability to network analyzer 14, and may allow different types of network interfaces to be supported. Each IFC 24 may include ports for receiving and transmitting signals over communication links 21A and 21B, such as unidirectional optical signals, although the invention is not limited in that respect.

Network analyzer 14 receives inbound packets via inbound ports of IFCs 24, generates flow information 29 based on the received packets, and outputs traffic flow packets that include the flow information via outbound ports of IFCs 24. More specifically, upon receiving an inbound packet, control unit 26 retrieves and reads one or more blocks of data, referred to as the "key," that defines the packet flow associated with the packet. The key may, for example, typically comprises the header of the packet, and may contain a variety of information including, for example, the source and destination address for the packet, MPLS labels, VPN labels, Class of Service (CoS) information, and the like. Control unit forwards the key to traffic flow module 28, which computes and maintains traffic flow information 29 for defined packet flows.

Traffic flow module 28 generates the traffic flow information 29 based on the received packets. In particular, using the keys, traffic flow module 28 associates the received packets with respective packet flows, and updates statistics for the packets flows. For example, traffic flow module 28 may maintain one or more of the following for each defined packet flow: an accurate packet count, a byte count, the source IP address, the destination IP address, the next hop IP address, input interface information, output interface information, total octets sent, flow start time, flow end time, source and destination port numbers, TCP flags, IP type of service, originating AS, source address prefix mask bits, destination address prefix mask bits, or the like. The particular packet flows being monitored may be defined by the source and/or destination network address associated with the packets. Additionally, other routing information within the packets may be used to define the packet flows for which flow statistics are maintained, such as MPLS labels, VPN labels, Class of Service (CoS) information, and the like. In general, statistics for particular packet flows can be maintained to a level of granularity desired for effective traffic analysis. Tree-like data structures may be used, as outlined in greater detail below, to define varying levels of packet flow granularity.

Traffic flow module 28 further generates traffic flow packets based on traffic flow information that is accumulated over time. In particular, after a given period of time (which may be fixed or dynamic), traffic flow module 28 generates a traffic flow packets for packet flows being monitored. The traffic flow packets are output to control unit 26, which forwards the traffic flow packets to a particular destination address via an outgoing port of IFCs 24. The destination may correspond to packet flow collector 16, where an administrator can examine packet flows for the entire network 6 (FIG. 1). In accordance with the prnciples of the invention, output of traffic flow packets can be rate-controlled. In other words, output of traffic flow packets may occur at an export rate, e.g., as defined by a number of traffic flow packets to be output and an amount of time allocated for the output.

Control unit 26 and other components of network analyzer 14 may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of network analyzer 14 may be implemented by executing the instructions of the computer-readable medium with one or more processors, discrete hardware circuitry, firmware, software executing on a programmable processor, or a combination of any of the above.

Figure 3:
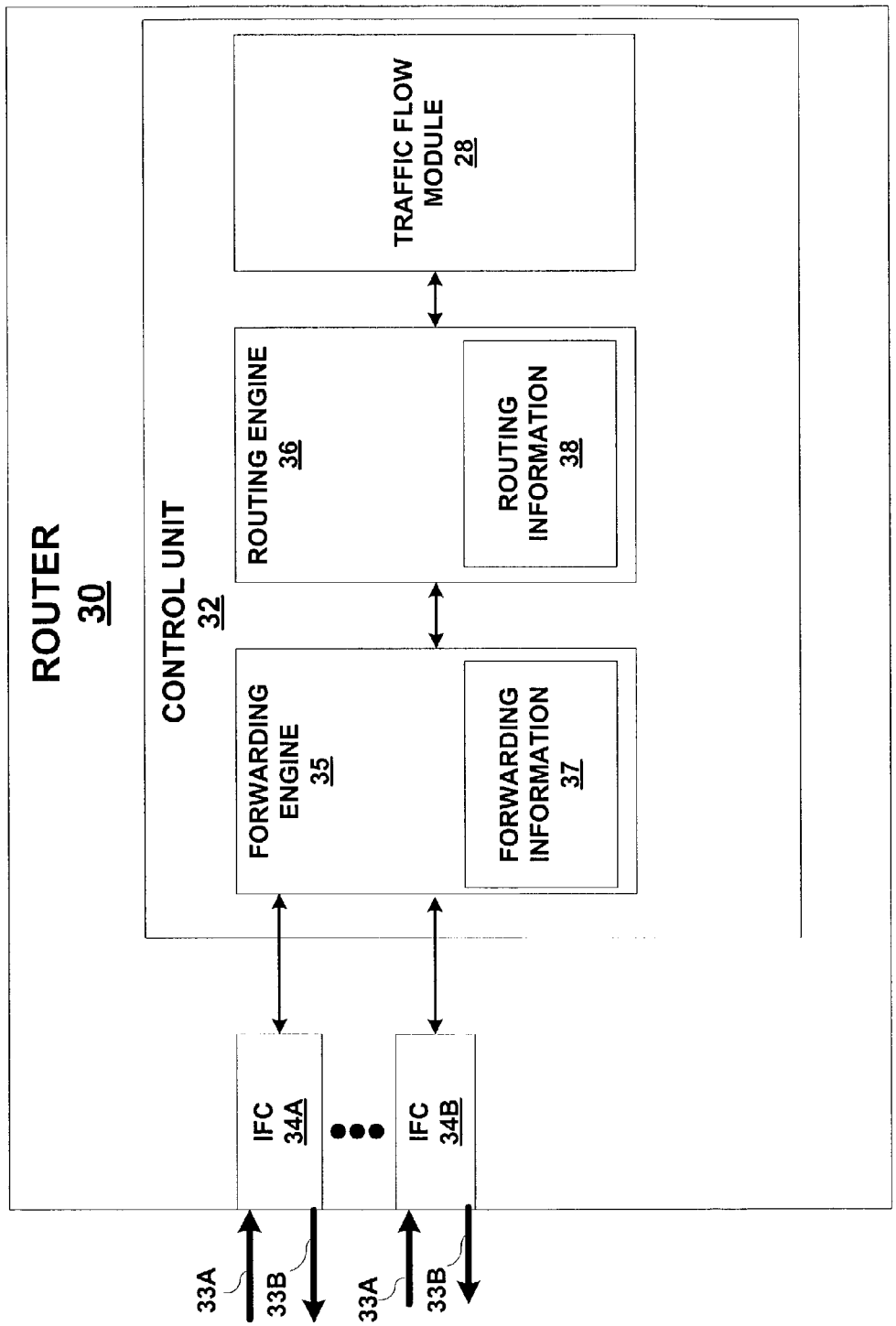
FIG. 3 is a block diagram illustrating an exemplary embodiment of a network analyzer in the form of a network router.

FIG. 3 is another block diagram illustrating an example embodiment of network analyzer in which the network analyzer comprises a fully functional network router 30 that receives packets and forwards the packets to a next hop according to routing tables. In particular, router 30 includes a control unit 32 that directs inbound packets received from inbound links 33A of IFCs 34 to appropriate outbound links 33B of IFCs 34. In the illustrated exemplary embodiment, the functionality of control unit 32 can be divided between a routing engine 36 and a packet-forwarding engine 35.

Routing engine 36 is primarily responsible for maintaining routing information 38 to reflect the current network topology. In order to maintain an accurate representation of the network, router 30 may support a number of protocols for exchanging routing information with other routers. For example, router 30 may support the Border Gateway Protocol (BGP), for exchanging routing information with routers of other autonomous systems. Similarly, router 30 may support the Intermediate System to Intermediate System (IS—IS) protocol, which is an interior gateway routing protocol for communicating link-state information within an autonomous system. Other examples of interior routing protocols include the Open Shortest Path First (OSPF), and the Routing Information Protocol (RIP).

Routing engine 36 directs packet-forwarding engine 35 to maintain forwarding information 37 in accordance with routing information 38 stored in routing engine 36. Forwarding information 37 stored in forwarding engine 35 is based on routing information 38 stored in routing engine 36. In particular, forwarding engine 35 associates packet information, e.g., the key of each packet, with specific forwarding next hops (FNH). A FNH generally refers to a neighboring router physically coupled to a source router along a given route. For example, the FNH for a route may specify a physical interface and media access control (MAC) address for the interface associated with the next router along the FNH.

Each of packet-forwarding engine 35 and routing engine 36 may comprise one or more dedicated processors, hardware, software, firmware, and the like, and may be communicatively coupled by a data communication channel. For example, a data communication channel such as a high-speed network connection, bus, shared-memory or other data communication mechanism may be implemented to facilitate communication between packet forwarding engine 35 and routing engine 36. In another embodiment, each of packet-forwarding engine 35 and routing engine 36 may be implemented in software. In yet another embodiment, packet-forwarding engine 35 can be implemented in hardware, with routing engine 36 being software-implemented. In any case, router 30 controls the flow of packets in order to integrate routing, and network analysis functionality. For example, packet-forwarding engine 35 may extract the keys from received packets, and forward the keys to routing engine 36. Routing engine 36 can then send the keys to traffic flow module 28 in order to facilitate traffic flow analysis and traffic flow packet generation consistent with the principles of the invention as described herein. Alternatively, packet forwarding engine 35 may send the keys directly to traffic flow module 28, or routing engine 36 may extract the keys from received packets and forward the keys to traffic flow module 28. Routing engine 36 may be implemented in software, with traffic flow module 28 also being implemented as a software module. In some cases, traffic flow module 28 may be viewed as an integrated part of routing engine 36, e.g., a software process or contained hardware unit, rather than a separate module as illustrated. Alternatively, traffic flow module 28 may comprise one or more microprocessors, field programmable gate arrays (FPGAs), application specific integrated circuits (ASICs), combinations thereof, and the like.

In still other embodiments, the functionality of traffic flow module 28, outlined in greater detail below, may be incorporated into a service card that can be removably inserted into router 30 in a similar manner to the insertion of IFCs 34. In that case, the traffic flow service card could receive the keys directly from forwarding engine 35, generate flow information based on the received packets as defined by the keys, and output traffic flow packets that include the flow information to forwarding engine 35. Alternatively, traffic flow module 28 may be integrated as part of forwarding engine 35 to calculate traffic flow information. In any case, forwarding engine 35 forwards the traffic flow packets to the appropriate outbound port of the appropriate IFCs 34.

Whether implemented as software, hardware or a removable traffic flow service card, traffic flow module 28 can be configured to output traffic flow packets in a rate-controlled fashion. In this manner, the transmission of traffic flow packets from network analyzers 14 to packet flow collector 16 can be made more robust, avoiding overflow at the input of packet flow collector 16 which could otherwise result in data loss at packet flow collector 16.

Figure 4:
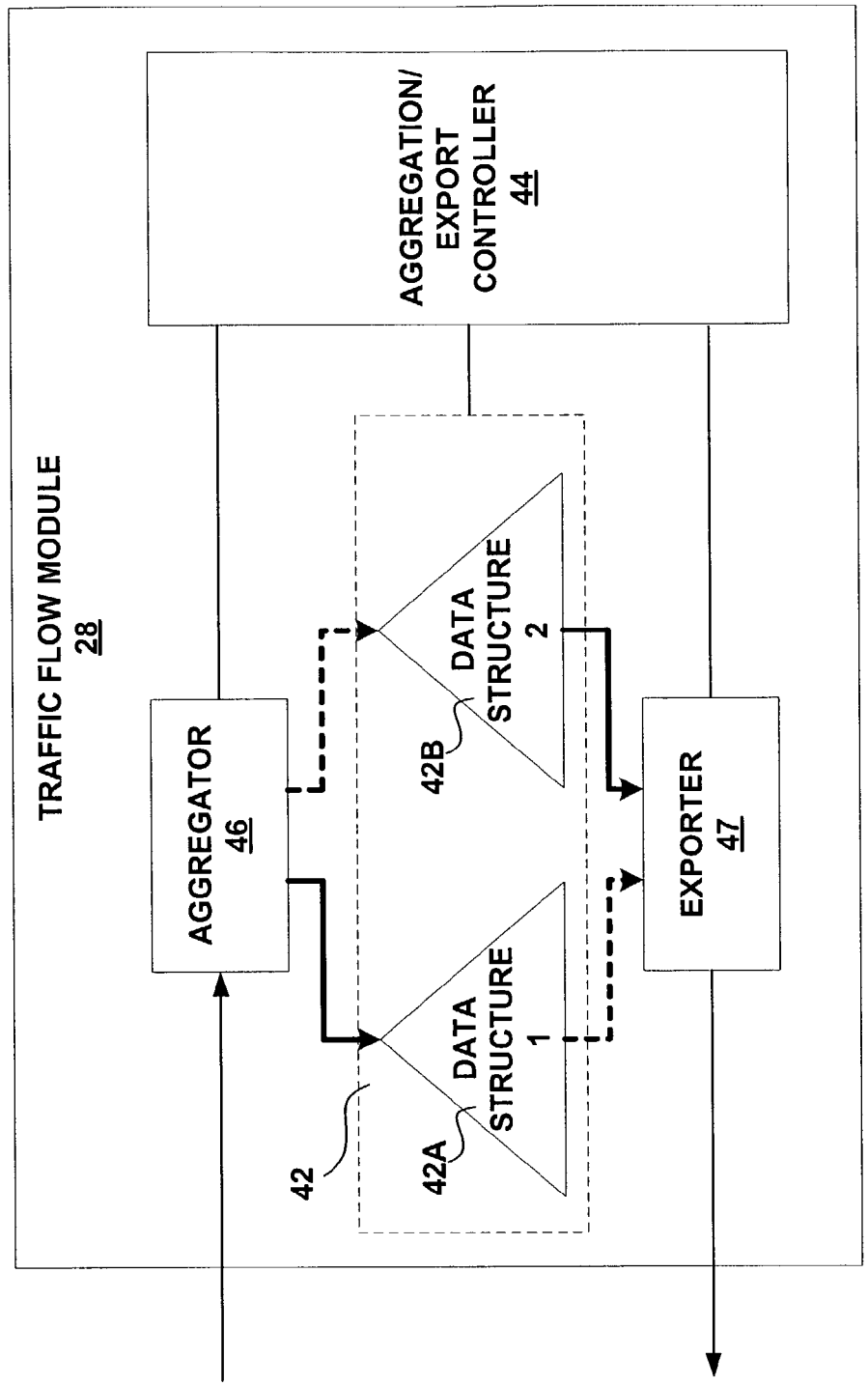
FIG. 4 is a block diagram of an exemplary traffic flow module.

FIG. 4 is a block diagram illustrating traffic flow module 28 in greater detail. Again, traffic flow module 28 may be implemented in hardware, software, firmware or various combinations. Additionally, traffic flow module 28 may be incorporated as hardware or software of a traffic flow service card that may be removably inserted into the chassis of a network analyzer. Traffic flow module 28 includes a set of data structures 42, an aggregation/export controller 44 (hereafter controller 44), an aggregator 46, and an exporter 47. Aggregator 46 and exporter 47 may form part of controller 44, but are illustrated separately for clarity.

In accordance with the principles of the invention, traffic flow module 28 receives keys that correspond to received packets, and updates flow information associated with the received packets. In order to improve traffic flow analysis and facilitate rate-controlled transmission of traffic flow packets, traffic flow module 28 includes a plurality of data structures 42. In particular, as illustrated, traffic flow module 28 may include at least two data structures 42A and 42B, although additional data structures could also be used in accordance with the principles described herein. Alternatively, a single data structure could be partitioned into two or more portions that are assigned duties as outlined herein. Traffic flow information 29 of FIG. 2 may be implemented in a manner similar to data structures 42.

Controller 44 assigns duties to data structures 42 on a dynamic basis. If traffic flow module 28 is implemented in software, the assignment and reassignment of the duties of data structures may occur via controller 44 adjusting pointers to the respective data structures 42. In any case, controller 44 can select one data structure as an accumulation data structure, and the other as an export data structure for a first period of time. Controller 44 may then reverse the assignments, in that the one of data structures 42 previously used for accumulation is subsequently used for export, and the other one of data structures 42 previously used for export is subsequently used for accumulation. In this manner, one of data structures 42 may always be available for real-time accumulation of packet flow information. Moreover, export of data from the export data structure, e.g., output of traffic flow packets that include the information in the export data structure can be performed more slowly, avoiding output of large batches of traffic flow packets. Such rate-controlled output can help ensure that batch transmissions of traffic flow packets by one or more network analyzers 14 will not overflow input buffers of packet flow collector 16.

Aggregator 46 includes input buffers for temporarily storing keys associated with received packets. In addition, aggregator 46 may include a set of counters for generating flow statistics based on the keys. Aggregator 46 receives the keys that correspond to received packets, and parses the keys. Aggregator 46 updates traffic flow statistics associated with the keys within the data structure 42 currently assigned for aggregation. In other words, aggregator 46 examines the keys, identifies one or more packet flows associated with the received packets, and updates one or more counters to reflect accurate flow statistics of the packet flows. Consequently, generated flow statistics are stored in data structures 42. During the time when data structure 42A is used for aggregation, data structure 42B can be used for export, and vice versa. In particular, export from one of the data structures 42 can take place in a rate-controlled manner over the course of time during which the other of data structures 42 is used for aggregation.

As one example, a particular network destination may be represented within a packet key by a high level routing prefix, such as 11.0.0.1/8. Such a high level routing prefix may define a packet flow for which flow statistics are generated and accumulated. If desired, upon detecting significant traffic volumes, controller 44 may instruct aggregator 46 to further examine the key to identify more specific prefixes, such as 11.150.14.1/32, 11.0.0.1/32, and the like. Also, controller 44 may identify prefixes having relatively low levels of traffic, and may selectively remove the prefixes having relatively low levels of traffic from a set of prefixes being monitored.

Each of data structures 42 may be arranged as a tree-like data structure in which flow statistics are maintained at varying levels of granularity. The desired level of granularity may be defined by input received from packet flow collector 16 (FIG. 1), or may be defined by aggregation controller 46 in a fixed or dynamic fashion. Alternatively, data structures 42 may be arranged as tables, databases, flat files, linked lists, or other data arrangements.

The granularity of the flow statistics maintained by traffic flow module 28 may directly correlate with the granularity of defined routing prefixes. In other words, a routing prefix may be specified within a range of granularity that controls the association of packet flows with that prefix. Aggregator 46 receives the keys from each packet, and compares the routing information in the keys with defined prefixes being monitored to associate the packet with one of the prefixes.

For example, a specification of a prefix as 11/8 directs aggregator 46 to associate with the prefix all packets in which the first eight (8) bits of the key equals eleven (11). In this manner, a large number of packet flows can be aggregated and accurately counted. As another example, a prefix of 11.0.0.1/32 directs aggregator 46 to associate with the prefix all packets in which the first thirty-two (32) bits of the key equals 11.0.0.1. The prefixes may be further defined to capture very specific packet flows. For example, in one embodiment, traffic flow module 28 supports specification of a routing prefix so as to include a destination address, a source address, a communication protocol, a source port, and a destination port. Consequently, traffic flow module 28 generates flow statistics for a set of routing prefixes that represent the topology of network 6. This or other information that may be included in the keys may be used to define packet flows to varying levels of granularity.

Data structures 42 are used to store aggregated flow statistics, and then the aggregated statistics are packaged by exporter 47 into traffic flow packets and transmitted to packet flow collector 16 (FIG. 1). More specifically, one of data structures 42 is used for aggregation while the other is used for export of traffic flow packets that include traffic flow information. Controller 44 switches which of data structures 42 is used for aggregation and which is used for export. The switching may occur on a periodic (timed) basis, or may occur dynamically based on traffic flow activity or some other criteria.

When controller 44 switches a given data structure 42 from an aggregation data structure to an export data structure, it also identifies an export time period during which export of the information in the given data structure can occur. Accordingly, exporter 47 can generate and export traffic flow packets using the traffic flow information in the given data structure in a rate-controlled fashion. Consequently, the output of large batches of traffic flow packets can be avoided, which can in turn avoid overflow at packet flow collector 16 and thereby avoid data loss.

Exporter 47 uses the information in one of data structures 42 currently assigned as the export data structure to create traffic flow packets. In particular, for packet flows defined in data structures 42, exporter 47 may generate traffic flow packets that include the flow statistics for the respective packet flows. The destination address and routing information associated with the generated packets may define packet flow collector 16 as the destination. Upon generating the traffic flow packets, exporter 47 can output the packets for transmission over network 6.

In accordance with the principles of the invention, exporter 47 incorporates a rate-control technique to limit the output of traffic flow packets. In particular, controller 44 may identify an amount of time during which export can occur, and exporter 47 may process the one of data structures 42 currently assigned as the export data structure to generate and output traffic flow packets in a rate-controlled manner over the defined course of time. As one example, if controller 44 identifies a one minute time frame during which export can occur, exporter 47 may identify a number of packets (N) to be exported from the one of data structures 42 assigned as an export data structure, and may output approximately N/60 traffic flow packets each second. In other words, exporter 47 can implement a desired export rate based on a number of packets to be output and an amount of time allocated for the output. By way of example, exporter 47 may identify or estimate the number of packets (N) to be exported by identifying the number of nodes defined in the data structure, or an overall amount of data stored.

Exporter 47 may generate and output traffic flow packets continuously over the allotted export time frame, or in small bursts, e.g., if N packets are to be transmitted in one minute, then approximately N/12 packets may be output every five seconds. In any case, using a rate-controlled technique can avoid large batches of traffic flow packet transmissions, which could otherwise overload packet flow collector 16. In one embodiment, the format of traffic flow packets comply with the user datagram protocol (UDP protocol), although other protocols could be also used.

Figure 5A:
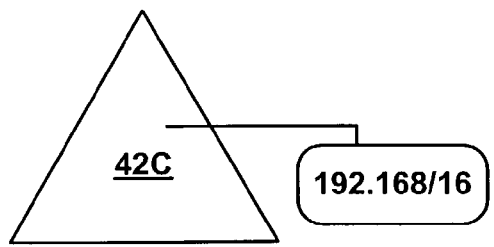
FIGS. 5A–5C are block diagrams that provide a high-level overview of a data structures that can be implemented in a traffic flow module.
Figure 5B:
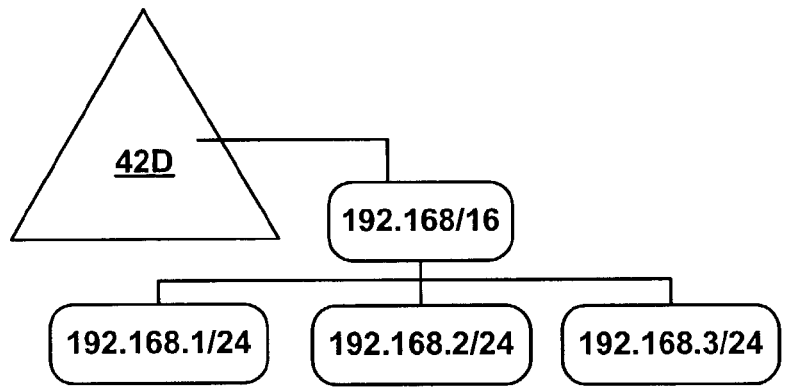
Figure 5C:
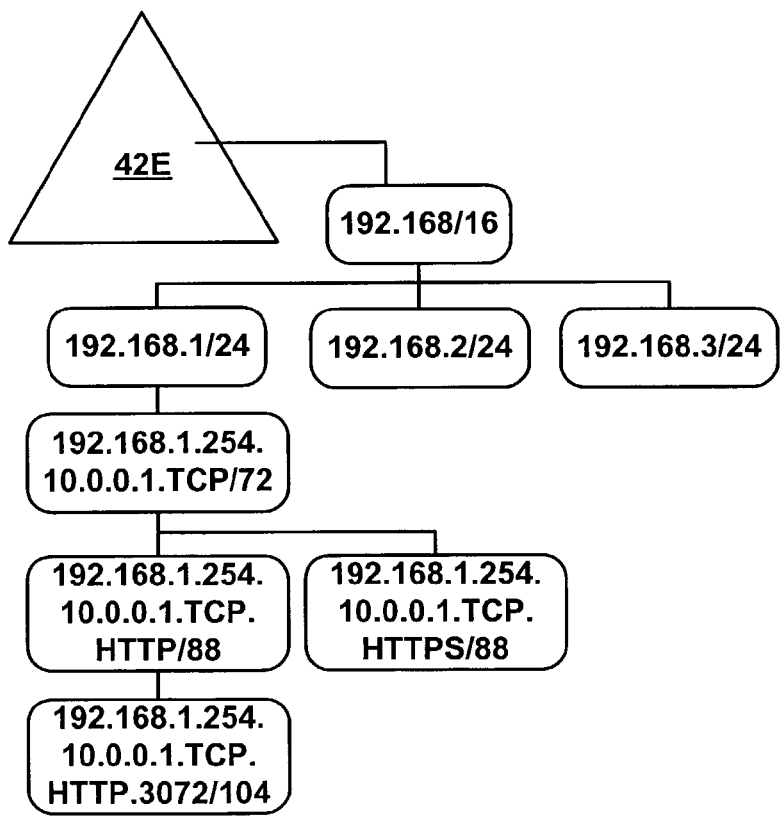

Data structures 42 may comprise tables, data-trees, databases, flat files, linked lists or the like. As one example, data structures 42 comprise tree-like data structures having a set of nodes that correspond to the packet flows being monitored. FIGS. 5A–5C are block diagrams that provide a high-level overview of exemplary data structures 42. In particular, FIG. 5A illustrates data structure 42C as a radix tree having a resolution node that specifies prefix 192.168/16. FIG. 5B illustrates a similar data structure 42D with more specific resolution. In particular, data structure 42D includes specific resolution nodes for prefix 192.168.1/24, 192.168.2/24 and 192.168.3/24. Packets having keys that satisfy prefix 192.168/16, but not the more specific prefixes, may be associated with the prefix 192.168/16. Packet flow statistics may be stored in each node.

As illustrated in FIG. 5C, data structure 42E provides even more granularity of the packet flows associated with 192.168.1/24. For example, packet flows may be defined by a source and destination network address, and an identifier for the protocol type, i.e., 192.168.1.254.10.0.1.TCP/72. Aggregator 46 may further refine the granularity of the traffic analysis by inserting prefixes 192.168.1.254.10.0.1.TCP.HTTP/88 and 192.168.1.254.10.0.1.TCP.HTTPS/88. In addition, aggregator 46 may insert a 104-bit prefix that also specifies a source and destination port numbers, i.e., 192.168.1.254.10.0.1.TCP.HTTP.3072/104. Other information from a packet may also be used, such as MPLS labels, VPN labels, Class of Service (CoS) information, and the like. In this manner, traffic flow module 28 may generate fine-grain statistics for particularized packet flows, yet maintain accurate information without resorting to statistical sampling.

FIG. 6 illustrates an example data structure 42F in the form of a table that may be used to log and preserve packet flow statistics. In the illustrated example, data structure 42F includes a packet count seven (7) prefixes, and stores a packet count and a byte count for each prefix. These and other configurations of data structures 42 may be used. The data structures illustrated in FIGS. 5A–5C and FIG. 6 are simplified in terms of the number of packet flows being monitored. In many cases, hundreds or even thousands of packet flows can be defined and monitored.

Figure 7:
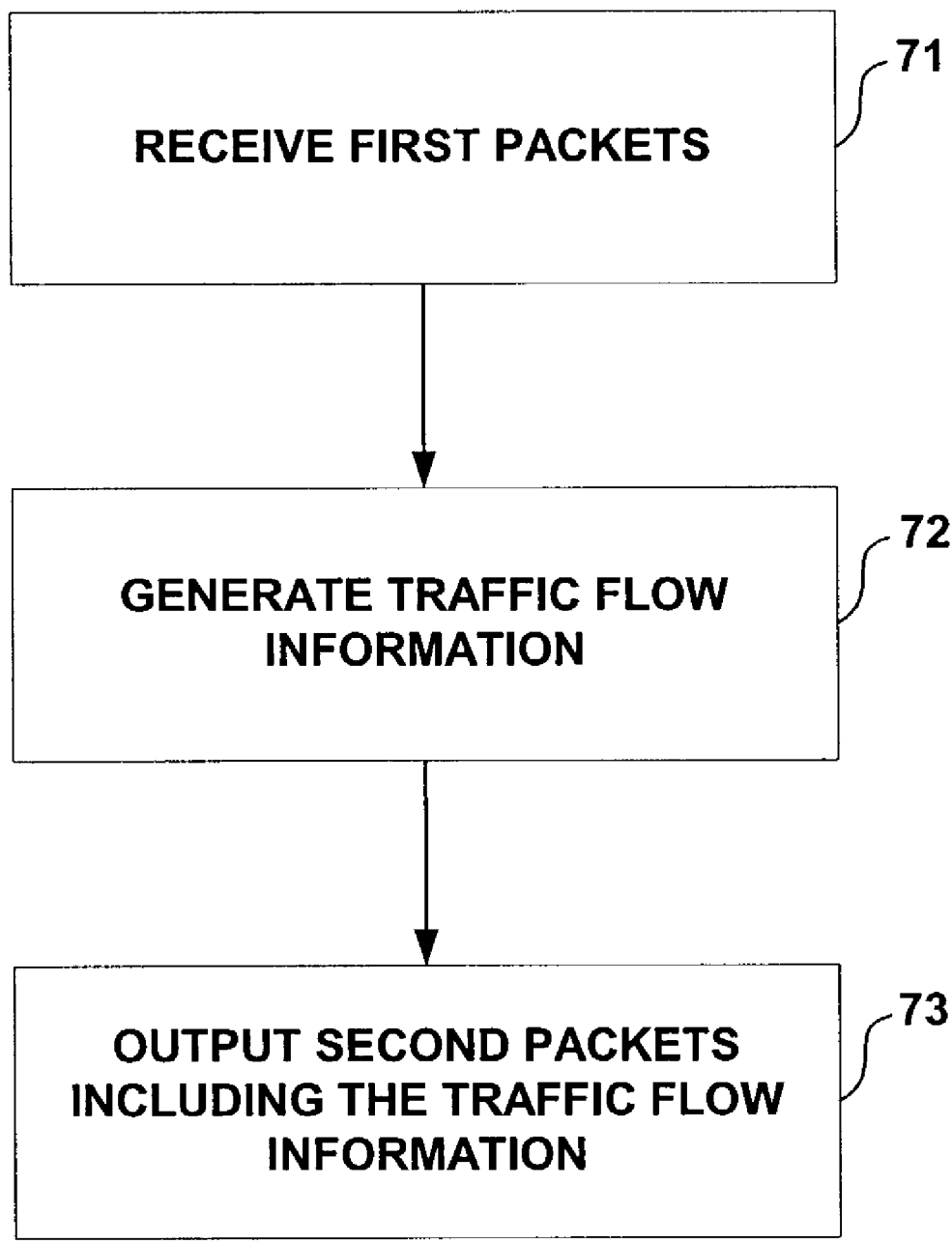
FIGS. 7 and 8 are flowcharts illustrating techniques consistent with the principles of the invention.

FIG. 7 is a flowchart providing a high-level overview of the operation of network analyzer 14. As shown, network analyzer 14 receives first packets from network 6 (71). Network analyzer 14 generates traffic flow information based on the received packets (72), such as by forwarding the keys of the packets to traffic flow module 28 for traffic analysis. Traffic flow module 28 outputs second packets containing the traffic flow information for transmission over network 6 to packet flow collector 16 (73). As described herein, output of the second packets in a rate-controlled manner can improve network analysis by avoiding data loss.

Figure 8:
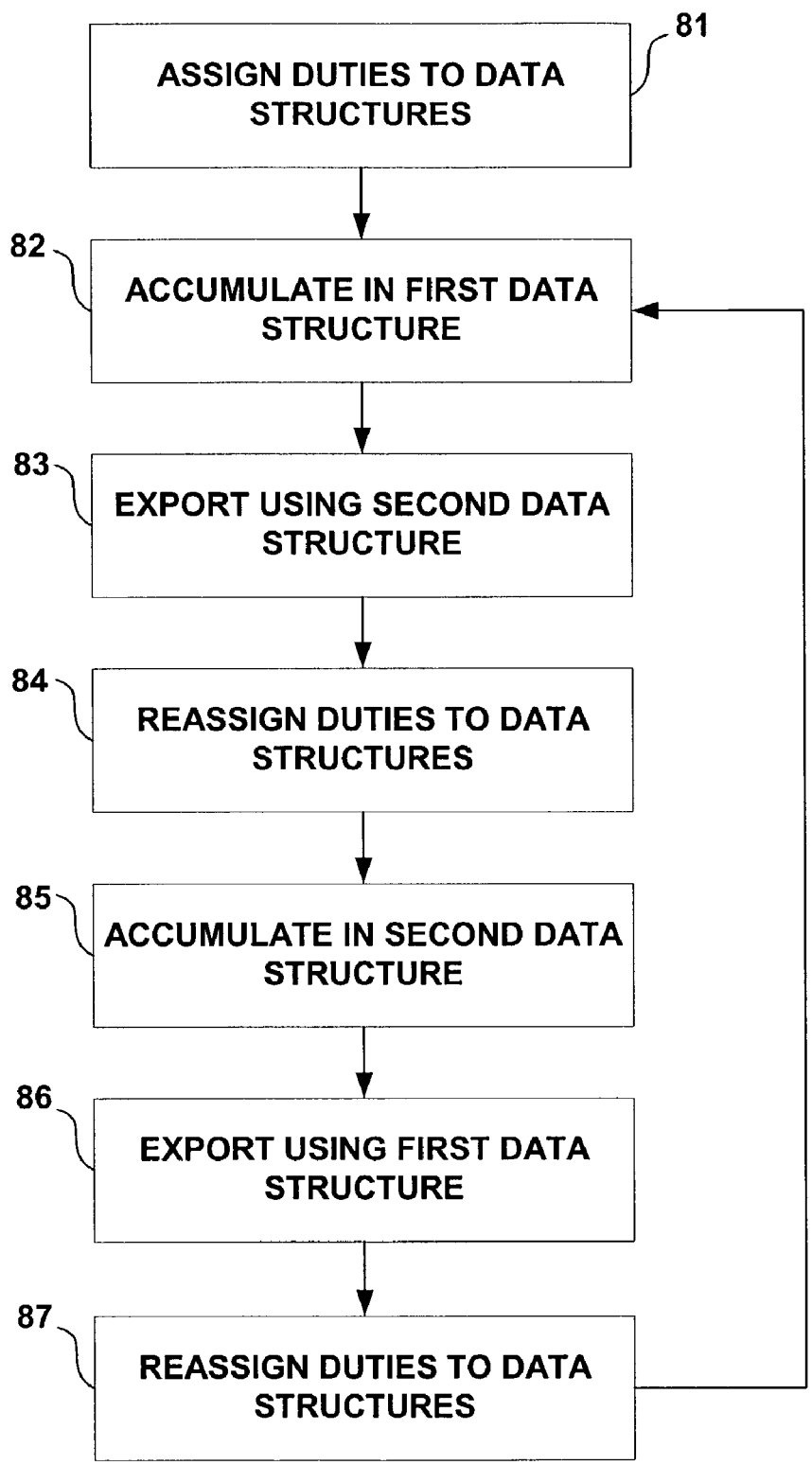

FIG. 8 is another flowchart consistent with the principles of the invention. As shown, controller 44 of traffic flow module 28 assigns duties to data structures 42 (81). In particular, controller 44 selects one data structure, e.g., 42A as an accumulation data structure, and the other, e.g., 42B as an export data structure. Traffic flow module 28 accumulates packet flow information in the first data structure 42A (82) and exports any information in the second data structure 42B (83). Accumulating (82) and exporting (83) are illustrated as sequential, but in practice they may be performed concurrently. Controller 44 then reassigns the duties of data structures 42 (84). In particular, data structure 42A becomes the export data structure, and data structure 42B becomes the aggregation data structure. At that point, traffic flow module 28 accumulates packet flow information in the second data structure 42B (85) and exports the information in the first data structure 42A (86). Again, although accumulating (85) and exporting (86) are illustrated as sequential, in practice, they may be performed concurrently. In any case, the process continues in a cyclical fashion with the reassignment of duties of data structures 42 (87).

The aggregation and exportation using distinct data structures may facilitate rate-controlled output of traffic flow packets, which as outlined above, can avoid data loss at packet flow collector 16. In particular, exportation (83 and 86) may involve the generation and output of a subset of traffic flow packets corresponding to a subset of nodes in the respective data structure. Exportation can occur over a defined period of time in small bursts of subsets of the of traffic flow packets corresponding to a subset of nodes in the respective data structure so that a large number of traffic flow packets are not output at once. Alternatively traffic flow packets may be output continuously, albeit in a non-bursty fashion, approximately over the full course of time allotted for exportation. In any case, the output rate of traffic flow packets may be based on a number of traffic flow packets to be output and the amount of time allotted for exportation. Moreover, the amount of time allotted for exportation may correlate approximately to the amount of time allotted for aggregation, e.g., in the other data structure.

In some cases, if little or no traffic occurs, the reassignment of the duties of data structures 42 may be skipped for one or more reassignment cycles. In other words, if the data in data structure 42A has been exported, but little or no data was accumulated in data structure 42B, e.g., due to network inactivity, then the reassignment of duties may be purposely avoided for a more extended period of time. Additionally, the time between the reassignment of the duties of data structures 42 may be adjusted for different traffic scenarios, and may even be dynamically defined by controller 44 based on factors such as the level network traffic. In any case, the initial accumulation time may be fixed for any given interval so that a desired export rate can be defined for that export interval. In other words, the export rate can be based on the initial accumulation time and the number of packets to be output.

Figure 9A:
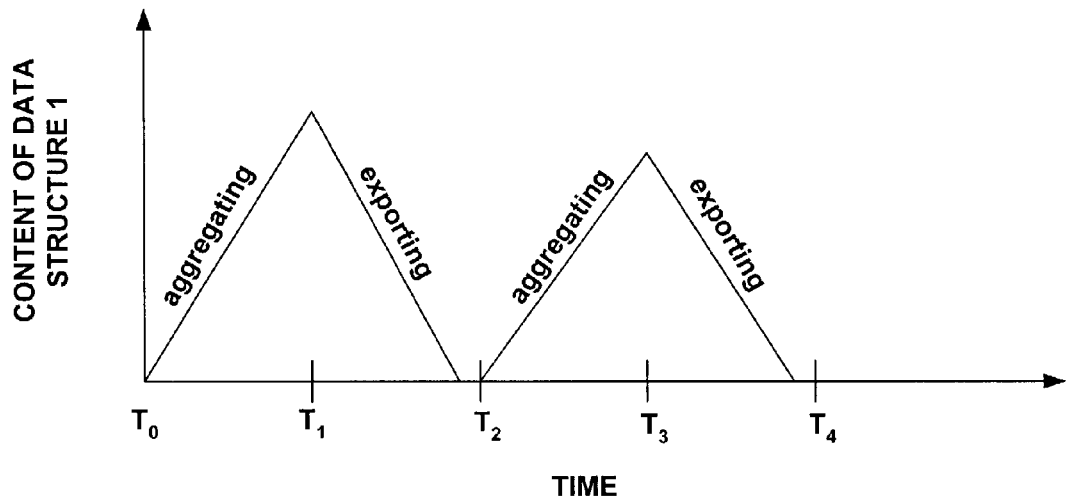
FIGS. 9A, 9B, 10A and 10B are timing diagrams consistent with the principles of the invention.
Figure 9B:
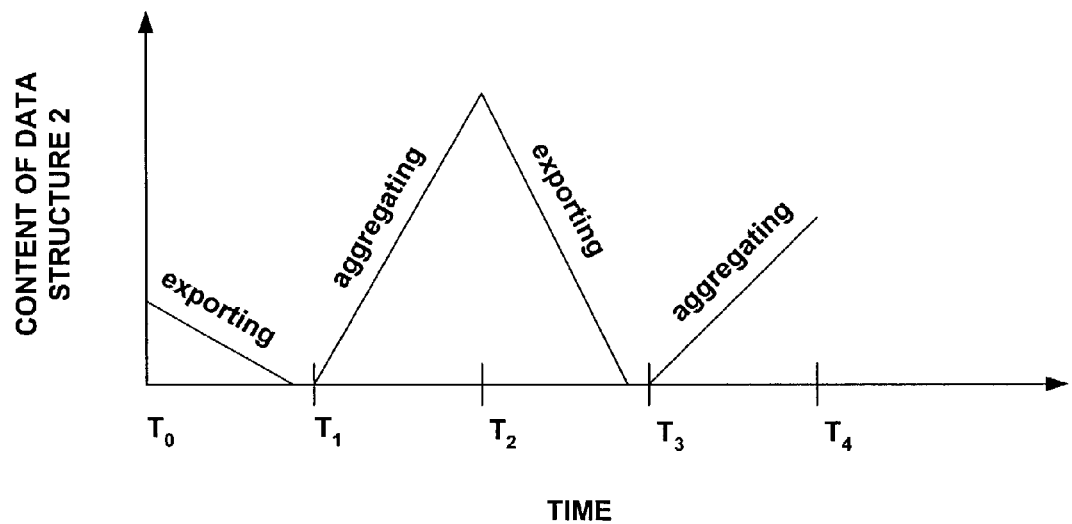

FIGS. 9A and 9B are timing diagrams illustrating exemplary content of data structure 1 (42A) relative to the content of data structure 2 (42B) as a function of time. As collectively illustrated in FIGS. 9A and 9B, when data is being accumulated in data structure 1, e.g., between time intervals $T_0$ to $T_1$, and $T_2$ to $T_3$, data is being exported from data structure 2. Similarly, when data is being accumulated in data structure 2, e.g., between time intervals $T_1$ to $T_2$, and $T_3$ to $T_4$, data is being exported from data structure 1. Moreover, the export of data from the data structures occurs in a substantially constant fashion as illustrated by the constant downward slope from $T_0$ to $T_1$ (FIG. 9B), $T_1$ to $T_2$ (FIG. 9A), $T_2$ to $T_3$ (FIG. 9B) and $T_3$ to $T_4$ (FIG. 9A). In other words, the output is not made in one large burst, but is instead performed in a rate-controlled manner over the course of the respective time interval. Although aggregation and export are illustrated in FIGS. 9A and 9B as being linear, this may not be the case in other embodiments.

Figure 10A:
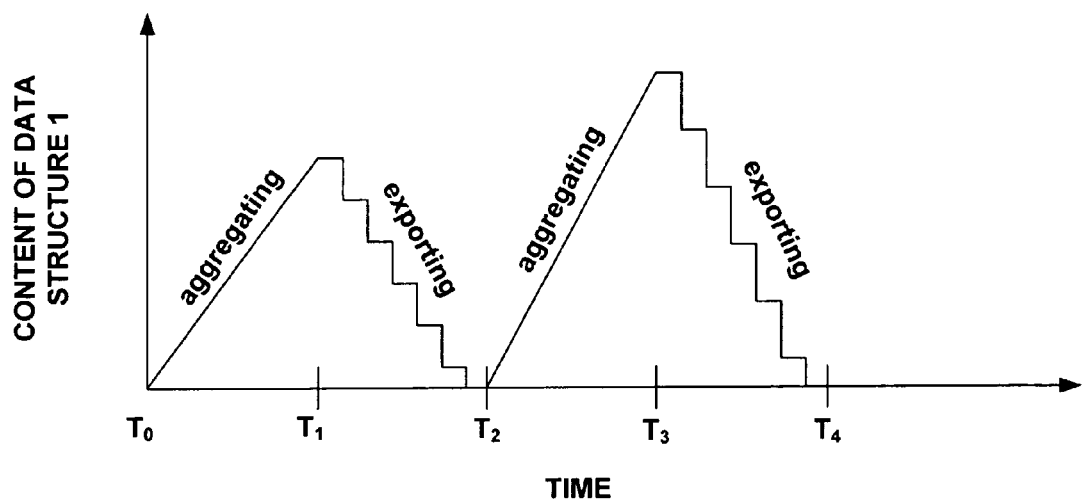
Figure 10B:
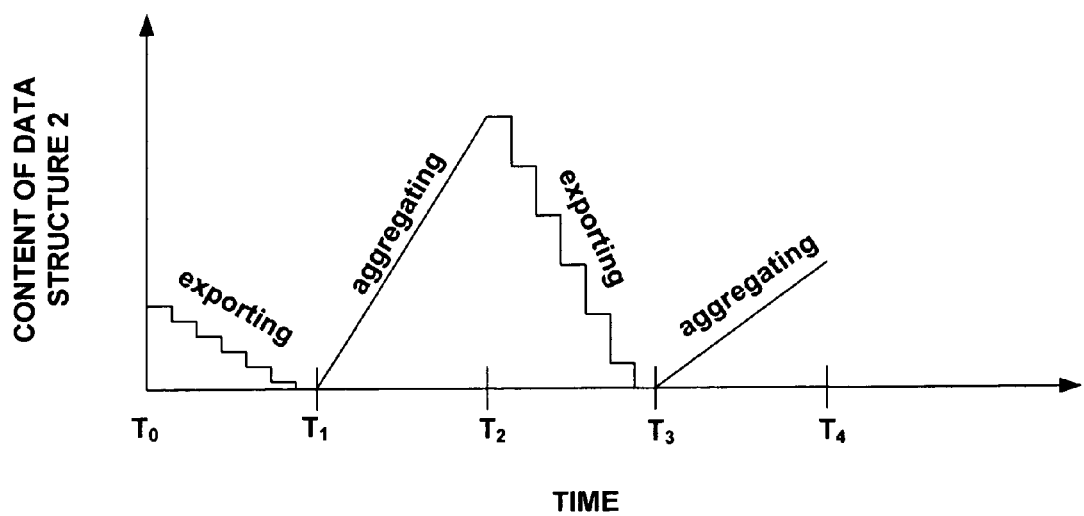

FIGS. 10A and 10B are additional timing diagrams illustrating exemplary content of data structure 1 (42A) relative to the content of data structure 2 (42B) as a function of time. In this case, the export of data from the data structures occurs in small bursts. In other words, the output is not made in one large burst, but is instead performed in rate-controlled small bursts over the course of the respective time interval. In particular, output of subsets of the traffic flow packets occurs at intervals of the time allotted. For example, as shown in FIG. 10B six small bursts of packet outputs occur over the course of the interval $T_2$ to $T_3$, causing data structure 2 to be emptied over the course of the interval $T_2$ to $T_3$, without exporting a large burst of packets at any given instance.

Various embodiments of the invention have been described. Nevertheless modifications may be made to the techniques and implementations described herein without departing from the sprit and scope of the invention. For example, traffic flow module 28 may incorporate a direct link to packet flow collector 16. In that case, traffic flow packets could be sent directly from traffic flow module 28 to packet flow collector 16 in the rate-controlled manner, without going out on network 6 via outbound communication links 21B. In addition, traffic flow module 28 may be incorporated into a service card that is removably insertable into a chassis of a network analyzer. Also, the same principles may be applied when a single data structure is used, with accumulation and exportation being assigned and reassigned to different portions of the data structure. In that case, the separate portions of the single data structure can be viewed as first and second data structures as described herein. These and other embodiments are within the scope of the following claims.

The invention claimed is:

1. A method comprising:
   receiving packets from a network;
   associating the packets with a packet flow based on data within the packets;
   aggregating first traffic flow statistics for the packet flow by generating and storing the first traffic flow statistics in a first data structure;
   outputting the first traffic flow statistics stored in the first data structure to a packet flow collector for analysis of the network;
   while outputting the first traffic flow statistics:
   (i) receiving additional packets from the network;
   (ii) associating the additional packets with the same packet flow based on data within the additional packets;
   (iii) aggregating second traffic flow statistics for the packet flow based on the additional packets by generating and storing the second traffic flow statistics in a second data suture over an allotted amount of time; and
   (iv) controlling a rate of output of the first traffic flow statistics from the first data structure based on the allotted amount of time for the aggregation of the second traffic flow statistics in a second data structure such that the first traffic flow statistics are output substantially over a full amount of the time allotted for aggregation of the second traffic flow statistics in the second data structure.

2. The method of claim 1, further comprising alternating between the first and second data structures to store traffic flow statistics in one of the data structures, and output traffic flow statistics from the other data structure during subsequent time periods.

3. The method of claim 1, wherein outputting the first traffic flow statistics of the first data structure comprises outputting the first traffic flow statistics of the first data structure as a plurality of non-contiguous packet streams such that the first traffic flow statistics are output substantially over the full amount of time allotted for aggregation of the second traffic flow statistics in the second data structure.

4. The method of claim 1, wherein outputting the first traffic flow statistics comprises outputting subsets of packets at intervals of time over the full amount of time allotted for aggregation of the second traffic flow statistics in the second data structure.

5. The method of claim 1, wherein outputting the first traffic flow statistics comprises:
   determining an amount of data stored by the first data structure, and
   outputting packets at intervals to carry portions of the data stored by the first data structure.

6. The method of claim 1, wherein the traffic flow statistics defines a number of packets, a number of bytes, a time of capturing a first packet for the flow, a time of capturing a most recent packet for the flow, an incoming interface, an outgoing interface, a source, destination network mask, or a source/destination Autonomous System (AS) number.

7. The method of claim 1, wherein the traffic flow statistics define a number of packets for the flow, a number of bytes for the flow, a time of capturing a first packet for the flow, a time of capturing a most recent packet for the flow, an incoming interface by which the packets were received, an outgoing interface, a source for the flow, destination network mask, and a source/destination Autonomous System (AS) number.

8. An apparatus comprising:
   a network interface to receive first packets from a network; and
   a traffic flow module to generate traffic flow statistics based on the first packets, generate second packets that include the traffic flow statistics, and output the second packets including the traffic flow statistics in rate-controlled manner to a packet flow collector for analysis of the networks,
   wherein the traffic flow module includes a first data structure and a second data structure to aggregate the traffic flow statistics, and
   wherein a rate of output of a first subset of second packets associated with traffic flow statistics in the first data structure is controlled based on an amount of time allotted for aggregation of traffic flow statistics in the second data structure and a number of packets in the first subset of second packets.

9. The apparatus of claim 8, wherein the traffic flow module selectively alternates between the data structures to store the generated traffic flow statistics.

10. The apparatus of claim 8, wherein the traffic flow module exports the second packets in a plurality of non-contiguous streams so that the traffic flow statistics are output substantially over the full amount of the time allotted for aggregation of the flow statistics in the second data structure.

11. The apparatus of claim 8, wherein the traffic flow module maintains the first data structure to accumulate traffic flow statistics corresponding to a first set of the first packets, and the second data structure to accumulate traffic flow statistics corresponding to a second set of the first packets.

12. The apparatus of claim 11, the first data structure being further used for output of a first set of the second packets that include the traffic flow corresponding to the first set of the first packets.

13. The apparatus of claim 12, wherein output of the first set of second packets occurs during accumulation of traffic flow statistics corresponding to the second set of the first packets.

14. The apparatus of claim 13, wherein following output of the first set of the second packets, the first data structure previously used for output of the first set of second packets is used for accumulating traffic flow statistics corresponding to a third set of the first packets, and the second data structure previously used for accumulating traffic flow statistics corresponding to the second set of first packets is used for output of a second set of second packets, the second set of second packets including the traffic flow corresponding to the second set of the first packets.

15. The apparatus of claim 8, wherein the traffic flow module outputs subsets of the second packets at intervals of time.

16. The apparatus of claim 8, wherein the network interface comprises a set of interface cards to receive the first packets from the network, and further wherein the apparatus comprises a router, the router further including a control unit to:
  receive the first packets from an in-bound port of one of the interface cards;
  forward traffic flow statistics corresponding to the first packets to the traffic flow module; and
  forward the first packets to an out-bound port of one of the interface cards corresponding to a next hop for the first packets.

17. The apparatus of claim 16, wherein the control unit includes a packet forwarding engine coupled to a routing engine.

18. An apparatus comprising:
  a network interface to receive first packets from a network;
  a traffic flow module to generate traffic flow statistics associated with the first packets received form the network;
  a first data structure to accumulate the traffic flow statistics corresponding to a first set of the first packets;
  a second data structure to accumulate the traffic flow statistics corresponding to a second set of the first packets; and
  a controller to generate and output second packets based on the accumulated traffic flow statistics in the first and second data structures, wherein the controller causes output of a first set of second packets corresponding to statistics in the first data structure during a period of time when the traffic flow statistics is accumulated in the second data structure, and
  wherein the controller controls a rate of output of the first set of second packets associated with traffic flow statistics in the first data structure based on an amount of time allotted for accumulation of traffic flow statistics in the second data structure.

19. The apparatus of claim 18, wherein following output of the first set of second packets, the controller causes output of a second set of second packets corresponding to statistics in the second data structure during a period of time when traffic flow statistics corresponding to a third set of the first packets is accumulated in the first data structure.

20. The apparatus of claim 18, wherein the controller causes output of the first set of second packets corresponding to statistics in the first data structure by identifying a number of the second packets in the first set to be output during a period of time and causing output of subsets of the number of the second packets in the first set at intervals of the period of time.

21. A method comprising:
  receiving first packets from a network;
  generating traffic flow statistics for the first packets, wherein the traffic flow statistics are stored in a first data structure and a second data structure;
  generating second packets including the traffic flow statistics;
  outputting the second packets including the traffic flow statistics in a rate-controlled manner to a packet flow collector for analysis of the network; and
  controlling a rate of output of a first subset of second packets associated with traffic flow statistics in the first data structure based on an amount of time allotted for aggregation of traffic flow statistics in the second data structure.

22. The method of claim 21, further comprising:
  defining the first data structure to be used for aggregation of the traffic flow statistics;
  defining the second data structure to be used for output of the second packets; and
  following output of the second packets, redefining the first data structure to be used for aggregation and redefining the second data structure to be used for output.

23. The method of claim 21, further comprising outputting subsets of the second packets during intervals of time.

24. A method comprising:
  receiving first packets from a network;
  generating traffic flow statistics for the first packets received from the network;
  defining a first data structure as an aggregation data structure and a second data structure as an export data structure;
  aggregating the traffic flow statistics for a first set of the first packets in the first data structure;
  redefining the first data structure as the export data structure and the second data structure as the aggregation data structure;
  aggregating the traffic flow statistics for a second set of the first packets in the second data structure; and
  outputting a first set of second packets in a rate-controlled manner, the first set of second packets including the traffic flow statistics in the first data structure, wherein outputting the first set of second packets in a rate-controlled manner includes:
    identifying a number of the second packets in the first set;
    identifying a period of time to be used to output of the first set of second packets based on an amount of time allotted for aggregation of traffic flow statistics in the second data structure; and
    outputting subsets of the number of second packets in the first set during intervals of the period of time.

25. The method of claim 24, further comprising following output of the first set of second packets in the rate-controlled manner:
  redefining the first data structure as the aggregation data structure and the second data structure as the export data structure;
  aggregating traffic flow statistics for a third set of the first packets in the first data structure;
  outputting a second set of the second packets in a rate-controlled manner, wherein an amount of data associated with aggregation of the third set of the first packets is different than an amount of data associated with aggregation of the first set of the first packets.

26. A traffic flow service card capable of removable insertion into a network device comprising:
an interface for insertion within a slot of the network device; and
a traffic flow module coupled to the interface to generate traffic flow statistics based on first packets received by the network device, generate second packets to include the traffic flow statistics, and output the second packets including the traffic flow statistics in a rate-controlled manner,
wherein the traffic flow module includes a first data structure and a second data structure to aggregate the traffic flow statistics, and
wherein the traffic flow module controls a rate of output of a first subset of second packets associated with traffic flow statistics in the first data structure based on an amount of time allotted for aggregation of traffic flow statistics in the second data structure.

27. A computer readable medium comprising instructions that upon execution in a network analyzer cause the network analyzer to:
generate traffic flow statistics for first packets received from a network;
store the traffic flow statistics in a first data structure and a second data structure;
generate second packets to include the traffic flow statistics;
output second packets including the traffic flow statistics in a rate-controlled manner for transmission over the network to a packet flow collector for analysis of the network; and
control a rate of output of a first subset of second packets associated with traffic flow statistics in the first data structure based on an amount of time allotted for aggregation of traffic flow statistics in the second data structure.

28. The computer readable medium of claim 27, further comprising instructions that upon execution cause the network analyzer to:
define the first data structure to be used for aggregation of the traffic flow statistics;
define the second data structure to be used for output of the second packets; and
following output of the second packets, redefine the first data structure previously used for output to be subsequently used for aggregation and redefining the second data structure previously used for aggregation to be subsequently used for output.

29. The computer readable medium of claim 27, further comprising instructions that upon execution cause the network analyzer to output subsets of the second packets during intervals of time.

30. A computer readable medium comprising instructions that upon execution in a network analyzer cause the network analyzer to:
define a first data structure as an aggregation data structure and a second data structure as an export data structure;
aggregate in the first data structure traffic flow statistics for a first set of first packets received from a network;
redefine the first data structure as the export data structure and the second data structure as the aggregation data structure;
aggregate traffic flow statistics for a second set of the first packets in the second data structure;
generate second packet including the traffic flow statistics;
output a first set of second packets, the first set of second packet including the traffic flow statistics in the first data structure; and
control a rate of output of a first set of second packets associated with traffic flow statistics in the first data structure based on an amount of time allotted for aggregation of traffic flow statistics in the second data structure.

31. The computer readable medium of claim 30, further comprising instructions that upon execution cause the network analyzer to output the first set of second packets in a rate-controlled manner.

32. The computer readable medium of claim 31, further comprising instructions that upon execution cause the network analyzer to:
identify the number of second packets in the first set;
identify a period of time to be used to output of the first set of second packets; and
output subsets of the number of second packets in the first set during intervals of the period of time.

33. The computer readable medium of claim 30, further comprising instructions that upon execution cause the network analyzer to:
redefine the first data structure as the aggregation data structure and the second data structure as the export data structure;
aggregate traffic flow statistics for a third set of the first packets in the first data structure; and
output a second set of the second packets in a rate-controlled manner.

34. A method comprising:
receiving first packets from a network;
generating traffic flow statistics for the first packets;
storing the traffic flow statistics for the first packets in a first data structure;
generating second packets to include the traffic flow statistics in the first data structure;
defining an export rate for the second packets including the traffic flow statistics based on an amount of time allotted for subsequent accumulation of traffic flow statistics in a second data structure and a number of second packets associated with the traffic flow statistics in the first data structure to be output; and
outputting the second packets according to the export rate.

35. The method of claim 34, wherein outputting the second packets according to the export rate comprises outputting the second packets substantially continuously over the time allotted.

36. The method of claim 34, wherein outputting the second packets according to the export rate comprises outputting subsets of the second packets at intervals of the time allotted.

37. The method of claim 34, further comprising estimating the number of second packets based on a number of nodes in a data structure storing the traffic flow statistics.

38. The method of claim 34, further comprising estimating the number of second packets based on an amount of data in a data structure storing the traffic flow statistics.

39. An apparatus comprising:
a network interface to receive first packets from a network; and
a traffic flow module to generate traffic flow statistics for the first packets, store the traffic flow statistics for the first packets in a first data structure, generate second packets to include the traffic flow statistics in the first data structure, define an export rate for the second packets including the traffic flow statistics based on an amount of time allotted for subsequent accumulation of traffic flow statistics in a second data structure and a number of second packets associated with the traffic flow statistics in the first data structure to be output, and output the second packets according to the export rate.

40. The method of claim 39, wherein the apparatus outputs the second packets according to the export rate by outputting the second packets substantially continuously over the time allotted.

41. The method of claim 39, wherein the apparatus outputs the second packets according to the export rate by outputting subsets of the second packets at intervals of the time allotted.

42. A computer readable storage medium comprising:

a first data structure storing traffic flow statistics accumulated during a first time interval and exported during a second time interval;

a second data structure storing traffic flow statistics accumulated during the second time interval; and instructions to cause a processor to control the second interval of time for export of the traffic flow statistics from the first data structure based on an amount of time allotted for accumulation of traffic flow statistics in the second data structure.

43. The computer readable storage medium of claim 42, wherein following export from the first data structure of traffic flow statistics accumulated during the second time interval, the first data structure stores traffic flow statistics accumulated during a third time interval, wherein the traffic flow statistics accumulated during the second time interval in the second data structure is exported during the third time interval.

* * * * *

UNITED STATES PATENT AND TRADEMARK OFFICE
CERTIFICATE OF CORRECTION

PATENT NO. : 7,185,103 B1 Page 1 of 1
APPLICATION NO. : 10/241785
DATED : February 27, 2007
INVENTOR(S) : Sandeep Jain It is certified that error appears in the above-identified patent and that said Letters Patent is hereby corrected as shown below:

On Column 13, line 53 (claim 1), "suture" should read --structure--.

Signed and Sealed this

Ninth Day of December, 2008

JON W. DUDAS
*Director of the United States Patent and Trademark Office*